UNITED STATES PATENT OFFICE.

DAVID J. CARTWRIGHT, OF EASTON, PENNSYLVANIA, ASSIGNOR TO U. S. LIGHT & HEAT CORPORATION, OF NIAGARA FALLS, NEW YORK, A CORPORATION OF NEW YORK.

STORAGE-BATTERY PLATE.

1,220,604. Specification of Letters Patent. Patented Mar. 27, 1917.

Application filed February 21, 1916. Serial No. 79,563.

*To all whom it may concern:*

Be it known that I, DAVID J. CARTWRIGHT, a citizen of the United States, residing at Easton, in the county of Northampton and State of Pennsylvania, have invented new and useful Improvements in Storage-Battery Plates, of which the following is a specification.

The present invention relates to storage battery plates.

This application is a continuation as to common subject-matter of my application Serial No. 671,193, filed January 15, 1912.

One of the objects of the present invention is to provide a Planté plate of such proportions as to lessen the vertical growth in a plate of given capacity.

A further object is to provide a Planté plate in which the proportions of the plate and the direction of the ribs are so combined as to lessen the vertical growth of said plate.

Other objects will appear as the description proceeds.

Referring to the drawings—

Figure 1:
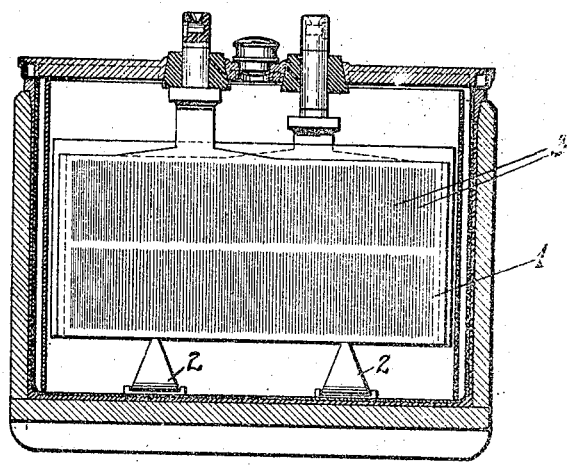
Figure 1 represents an embodiment of the present invention located in a battery box.
Figure 2:
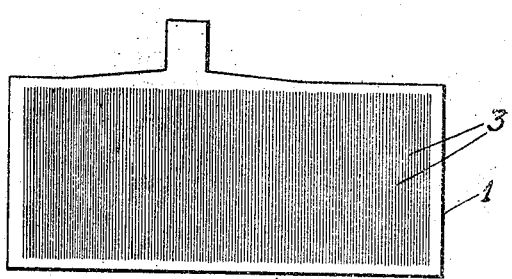
Fig. 2 represents an obvious modification of the plate illustrated in Fig. 1.

The individual Planté plates 1 are preferably supported above the bottom of the tank on suitable blocks of insulating material 2. The plates are considerably greater in width than in height. Ordinarily, Planté plates are greater in height than in width and the ribs run vertically. Planté plates tend to grow in a direction longitudinal of the ribs, which is vertically. In a plate of the novel proportions which I have illustrated, the ribs, which are indicated by the numeral 3, also run vertically, but the vertical growth is reduced, the capacity of the plate being maintained, however, as the area of the plate may be the same as the area of a rectangular plate of the old form.

In certain classes of service, Planté plates grow so much that they have to be trimmed about once a year. I have found that with my improved construction, under similar conditions, the plates need not be trimmed more than once every three years.

By increasing the width of the plates, and accordingly, the width of the jars, I increase the horizontal area of the jars and thereby increase the quantity of acid above the plates. As a result, the lowering of the acid level, due to evaporation, is slower with my improved construction than in the old construction. Consequently, it is not necessary to flush the jars as often as with previous storage batteries. Furthermore, with an increased area of the bottom of the jars and a decreased height of the plates, the accumulation and deposit of sediment on the bottom is not as rapid per unit of area. In other words, the accumulation does not rise so rapidly as in previous storage batteries of the same capacity.

In assembling the battery plates in the box, plates of the same polarity in a given cell are all provided with a common terminal member, after the manner of the ordinary construction.

One embodiment of the present invention has been illustrated in the drawings. Many modifications will occur to those skilled in the art, which modifications will fall within the scope of the invention as defined in the appended claims.

What I claim as new and desire to secure by Letters Patent of the United States, is—

1. A Planté plate for storage batteries, said plate having vertical ribs on the surface to increase the superficial area thereof and being greater in width than in height whereby vertical growth of a plate of given capacity is lessened during continued service.

2. A Planté plate for storage batteries, said plate including a central conducting web or support having one of its linear dimensions greater than the other, and a plurality of vertical fins or ribs formed on each face of said central web to increase the superficial area of said plate, said vertical fins or ribs extending across the plate at right angles to the greatest linear dimension thereof.

3. In a Planté type storage battery, in combination, a Planté plate having vertical fins or ribs formed on each side of said plate, said vertical ribs being across the face of least diameter of the plate, a terminal lug located on one of the edges of the plate of greatest length, and a conducting web located between said ribs, said web being of the same dimensions as the plate.

4. A storage battery including an inclosing tank of greater length than height, a plurality of Planté plates arranged vertically within said tank, the vertical dimensions of said plates being less than the horizontal dimensions thereof, said plates being provided with a plurality of ribs or fins on both faces thereof, said fins extending vertically at right angles to the greatest dimension of said plate, whereby growth of said plate in proportion to the area thereof is lessened.

In witness whereof, I have hereunto subscribed my name.

DAVID J. CARTWRIGHT.